United States Patent [19]

Stearns et al.

[11] Patent Number: 4,779,465
[45] Date of Patent: Oct. 25, 1988

[54] METHOD AND APPARATUS FOR TRAINING HORN PLAYERS

[75] Inventors: Stanley D. Stearns; John K. McGee, both of Houston, Tex.

[73] Assignee: Valco Instruments Company, Inc., Hanis County, Tex.

[21] Appl. No.: 12,187

[22] Filed: Feb. 9, 1987

[51] Int. Cl.⁴ .................... G01L 5/00; G10D 9/02
[52] U.S. Cl. .................... 73/862.54; 84/398
[58] Field of Search ............ 84/1.14, 1.15, 470 R, 84/477 R, 461, 462, 398, 399, 453, 465; 128/777; 73/862.51, 862.54, 862.64; 338/47

[56] References Cited

U.S. PATENT DOCUMENTS

| | | | |
|---|---|---|---|
| 1,543,655 | 6/1925 | Newman | 84/398 |
| 1,703,865 | 3/1929 | Arthur | 84/399 |
| 3,543,629 | 12/1970 | Barcus et al. | 84/462 X |
| 3,621,720 | 11/1971 | Clark | 73/862.64 X |
| 3,782,188 | 1/1974 | Korber et al. | 73/862.64 X |
| 4,119,007 | 10/1978 | Criglar et al. | 84/1.14 |
| 4,149,445 | 4/1979 | Wis | 128/777 X |
| 4,314,228 | 2/1982 | Eventoff | 84/1.14 X |
| 4,457,203 | 7/1984 | Schoenberg et al. | 84/477 R X |

FOREIGN PATENT DOCUMENTS 609543 10/1979 U.S.S.R. .................... 84/470 R

Primary Examiner—Charles A. Ruehl
Attorney, Agent, or Firm—Gunn, Lee & Jackson

[57] ABSTRACT

The present apparatus in the preferred and illustrated embodiment comprises first and second rings which are respectively affixed to the mouthpiece and mouth pipe. As force is increased by the musician in holding the mouthpiece against his lips, such force is measured by cooperative measuring means fixed to said first and second means. In the preferred embodiment, the force measuring means includes an aligned pin on one of said means positioned relative to a transducer coil to thereby provide an indication of force. The signal indicative of force is delivered to a time based recorder and is recorded as a function of time along with additional data including sound intensity levels and frequency of the music to provide correlation between force, intensity and frequency as a function of time. A method is also taught including the recording of such data to teach the musician to reduce the force applied against his lips.

17 Claims, 1 Drawing Sheet

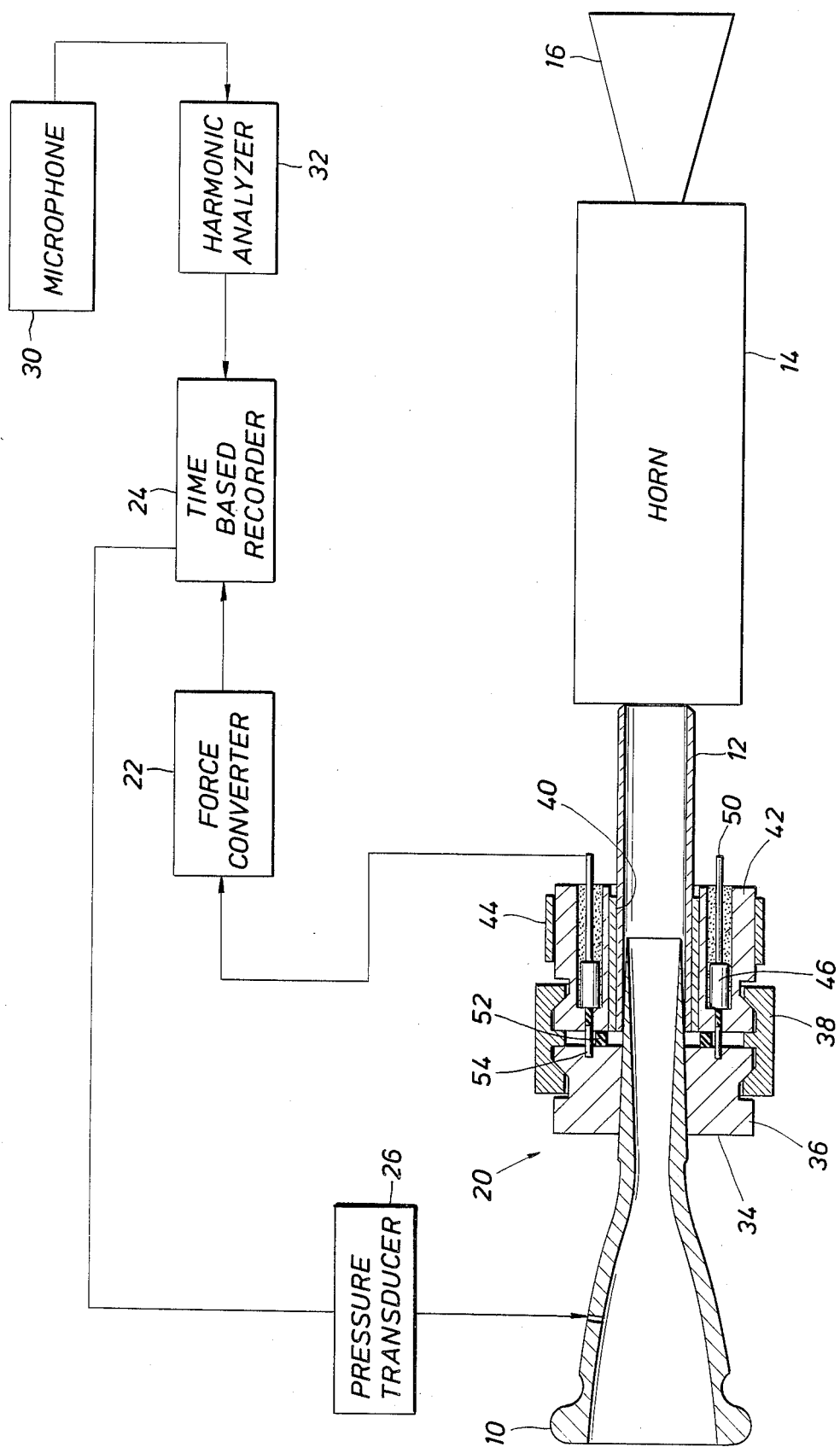

METHOD AND APPARATUS FOR TRAINING HORN PLAYERS

BACKGROUND OF THE PRESENT DISCLOSURE

This disclosure is directed to a method and apparatus which assists in training a horn player. The term "horn" refers to the typical brass instrument which has a mouthpiece connecting to the horn providing music from the bell of the horn. It may be a valved instrument such as a typical trumpet, or it may be free of valves. This also includes a trombone which uses the slide mechanism instead of valves. This would also include the baroque trumpet and many other instruments of a similar nature. This generally excludes reed instruments. In such horns, music is made by a combination of player and instrument. An air chamber is defined in the throat and mouth of the player utilizing tongue, hard palate and lips. The lips vibrate controllably initiating the vibration of the air from the mouthpiece to the bell. Technique is learned by an apprentice and may be carried to professional maturity by the apprentice. Surprisingly however, professional horn players usually do not have long professional lives in contrast with those of other musicians. For instance, piano players maintain manual dexterity and can sustain premier professional careers even into their eighties. The same is also true of string instrument players. There is a surprising lack of durability or longevity in horn players enabling them to perform up to this age range.

While admittedly every musician is susceptible to sudden injury of their hands or around the mouth and reconstruction may be required, there is the perhaps cumulative injury not arising from specific trauma but arising from horn playing which may limit the professional life of a horn player. To this end, any injury around the lips or teeth (e.g., replacement of teeth with dentures) may well force a mature horn player to relearn completely his techniques or retire. The present method and apparatus are particularly useful in teaching and training a horn player so that fundamental techniques originally learned are those which permit greatest longevity in a professional career. It has been discovered that an important factor in the quality of music from a horn player is the force applied through the horn held in the hands of the horn player against his lips. The lip contact with the mouthpiece generally forms a circular impression on the lips of the player and extending slightly therebeyond. In the instance of a trumpet player, the trumpet is held in one hand and is forced against the lips, thereby assuring proper contact between lips of the player and the instrument. As the musician plays through various scales, or as sound levels are changed to higher levels, the force applied through the hand holding the instrument may be increased. There are times when this increase in force is essential. However, there is a minimum or threshold force which is sufficient to obtain proper cooperation between the lips of the horn player and the mouthpiece. When the threshold force is exceeded, there is likely to be no further benefit. Accordingly, the question is how much force is excessive in contrast with the required threshold force to achieve a quality note.

As will be understood, this is something that can be discussed by a music teacher with a beginner but it is not something that can be easily transferred from the teacher to the beginner. As an example, the amount of force must vary depending on the particular note of the scale being played and the sound level to be achieved. With short notes, one will appreciate that the dynamics vary so rapidly that it is very difficult to teach a trainee proper forces to be applied. Moreover, the proper force is always variant in light of the interrelationship between this particular factor and other factors which determine the quality of the music played by the musician.

There is also the possibility that the passage of time will change the necessary minimum force essential for a particular horn player. For instance, should a person begin study of the horn at a young age, as they pass through adolescence to physical maturity, such a change completely varies every aspect of the horn player's lung capacity, mouth and lip size, construction, and strength and will otherwise impact the capabilities of the horn player. This provides another variable which, over a period of time, can markedly shift or change the performance of the musician. In part, this change in performance will be manifest by forces required to sustain a selected note at a selected level.

As will be understood, this sets forth a relatively complex, time dependent relationship. One mode of dealing with this is brought out by the present invention. It is particularly intended to be used in training a musician to form a type of reference so to speak, the reference to be preserved and compared later to be certain that the musician has not discretely changed style, primarily reflected by modification of the force applied against the lips with the horn to the detriment of the horn player. The horn player at a beginning point in his career, at later points and as often as necessary in accordance with the present invention should play a number of notes such as scales or arpeggios, the notes being sustained at selected durations and intensities and such data is recorded. The data should include (as a function of time) the sound level and the frequency of the note played. In addition, the force applied to the lips through the horn is encoded by a means to be described and that force is also recorded. As will be recalled, there is an optimum range of forces to be applied for a given frequency at a selected sound level. This force range is observed by the present apparatus so that the horn player can vary within the desired range to reduce the force for each note and thereby reduce the load applied against his lips by the mouthpiece.

After the passage of time, the horn player should repeat the foregoing exercise and compare the data. It may be that unobservable changes have been implemented, perhaps to the detriment of the horn player. For instance, the horn player may be bigger and stronger and is therefore using more force to press the mouthpiece against his lips. When this occurs, the horn player may not be aware of the fact. Through the use of the present invention, such awareness can be increased and the horn player can then ease the force and return to the optimum range of forces. The present method and apparatus is further useful in the event a horn player is injured around his lips or teeth. For instance, dental work may cause some measure of change. The present method and apparatus enables a time dated set of data to be obtained indicative of optimum performance. If this is stored over a period of time, the horn player can then observe changes and make corrections. In general terms, the corrections will be reduction of the force applied against the lips by the mouthpiece so that the horn player reduces the force to the optimum range, and even the minimum within that range, thereby decreasing the load applied to the lips of the horn player. This will enable the horn player to sustain consistency over a longer professional life and also to extend his professional life. It is particularly useful in enabling the horn player to develop habits and techniques which extend the professional life of the horn player and particularly decrease cumulative damage (if any) occurring to the lips and mouth of the user.

SUMMARY OF THE PRESENT DISCLOSURE

This disclosure is directed to a method and apparatus for periodically testing and providing information to a horn player enabling the horn player to change or develop his technique. Moreover, this method and apparatus is particularly useful in making reference or fixed set of data indicative of quality horn playing at a given age whereby that data can be referred to in subsequent years to restore the horn player to overcome changes in habits which may be detrimental to the horn player.

The apparatus includes a load transducer which is a fix between the mouth pipe and mouthpiece. This converts the loading into a signal which can be recorded on a time based recorder. Additionally, signals are provided from a pressure transducer fixed to the horn which relates to sound level or intensity. Last of all, a microphone picks up the musical note played so that the fundamental frequency of the note can also be recorded. Various harmonics can also be recorded as required to assure that the horn player can correlate force, sound level or intensity and note or tone as a function of time and thereby perfect playing habits.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing shows an attachment between the mouth pipe and mouthpiece of a horn for converting force applied against the lips of the horn player into a measured value and additionally shows transducers for obtaining performance information coupled to a time based recorder so that a record can be made of performance of the horn player.

DETAILED DESCRIPTION OF THE PREFERRED EMBODIMENT

In the only drawing, certain apparatus is shown which will be described first. A method of use of this apparatus will then follow. The apparatus is intended to cooperate with a conventional horn. To the degree that horns differ in physical size, referring to the size of the mouthpiece and mouth pipe, the present apparatus is made larger or smaller as needed to cooperate with such changes in size. Accordingly, the numeral 10 identifies a mouthpiece of conventional construction typical for the instrument of concern. As was mentioned before, this can be any one of the horn instruments, this being a term which excludes reed instruments. The conventional mouthpiece telescopes to a mouth pipe 12 which in turn connects with the horn 14. The horn provides music out of a bell 16. As was observed, the horn can be any one of the instruments in the horn family. This arrangement thus enables the present invention to be used with any horn, or a particular horn or horns having different voices. The horn thus includes the components described above; it is normally held in the hands of the player who presses the mouthpiece 10 against his lips.

The present apparatus includes a means identified generally by the numeral 20 which is affixed to the mouthpiece and mouth pipe. This is used to measure the force applied by the musician. It will be described in detail hereinafter. It forms several output signals which are summed at a force converter 22. A suitable scale factor is developed in the force converter 22, and this is then provided in the form of a signal to a time based recorder 24. The volume of the particular musical note may vary. Sound intensity can be measured by an external decibel meter. (Another mode of measuring volume is appropriate connection of a pressure transducer 26 preferably connected at the illustrated location.) Without regard to the internal pressure, it helpful to obtain an indication of sound level or intensity. This typically is measured in relative values, the units being decibels. Accordingly, the sound level or intensity measured in decibels is provided to the time based recorder 24. Thus, if the musician sustains a note for five seconds, the recorder 24 records the force applied by the hands of the musician pressing the instrument against his lips at the mouthpiece 10 and also correlates this force with the sound intensity from the instrument.

Another sensor utilizes a microphone 30 which picks up the musical note and delivers it to a harmonic analyzer 32. This can break the note down into the fundamental signal. Harmonics can be added as desired. This helps to know the correlation between a particular note, sound level or intensity and force. The note may have the right "sound" and thus be an acceptable note. If that is the case, it is important to know the mix of harmonics in the particular note. On the other hand, the note may have an inappropriate mix of harmonics and be less than acceptable to the ear of the trained musician. It is important to also know this fact as evidenced by harmonic content.

Going back to the means 20, certain details of construction should be noted. First of all, there is a ring 34 fastened around the mouthpiece 10. The ring 34 is preferably fixed so that it does not slide on the mouthpiece. It incorporates an outer profile at 36 to receive a clamp. The clamp 38 is a transportation clamp. It is removed during use. It typically has the form of a C-shaped ring which slides over the ring 34. It snaps into the external groove. This locks the components together. The transport clamp 38 is useful during storage of the musical instrument to insure that the various components are held together. A sleeve 40 is attached around the end of the mouth pipe. The sleeve 40 is fixed in location on the mouth pipe. It extends to the end of the mouth pipe. It does not interfere with telescoping of the mouthpiece 10 into the mouth pipe 12. Rather, it serves as a mounting sleeve for a second ring-like member 42. The ring-like member 42 is secured to the mouth pipe by a snug or tight sleeve 44 which extends fully around the ring 42. This assures that the structure does not slide up or down the mouth pipe 12. The exterior of the ring 42 is profiled to receive the transport clamp ring 38.

Preferably at three or four evenly spaced locations, axial passages are formed in the ring 42 parallel to the axis of the mouth pipe 12. The several passages are used to receive and hold a transducer 46. The transducer 46 typically has the form of a coil of wire embedded in the passage and is supported therein by an epoxy plug which fills the passage. Suitable conductors 50 extend from the coil along the passages in the epoxy plug to the force converter 22. A soft elastomeric ring 52 is spaced between the major rings 34 and 42. They are placed in a facing relationship but are separated by the seal ring 52. It is relatively soft in contrast with the materials used in the construction of the remainder of the structure. Moreover, the two rings are positioned to move together and thereby vary the spacing on compression of the soft ring 52. The relative position of the two rings is indicated. The ring 34 supports an alignment pin 54. For every transducer 46, there is also an alignment pin positioned to stab into a matching hole and thereby align the two major rings. Thus, there can be three such transducers located at 120° spacing, perhaps four at 90° spacing, etc. This arrangement of the several pins positions the pins so that they interact with the spaced coils. The pins are preferably made of ferromagnetic materials. As the pins are aligned with the various transducers, they change the inductance of the coil and thereby provide a measure of spacing between the pins and coils. Thus, the signal on the conductors 50 is indicative of spacing between the pin and the coil. The pins 54 serve two purposes one being component alignment of the second purpose being interaction with the detection coils.

In operation, the apparatus shown in the drawing is assembled with the instrument. As will be understood, this requires positioning of the sound intensity meter (e.g., pressure transducer) and also the microphone relative to the instrument. Ideally, a standard position is developed, as for instance positioning a microphone at a spaced distance on axis from the bell of a trumpet. Arbitrary spacing standards are implemented to assure duplication of the procedure at a later time. The sound intensity can be observed through the use of the same microphone if connected to a suitable intensity measuring system, including a decibel meter. Alternatively, pressure in the instrument at a selected location can be used. It is undesirable to drill into the instrument and to this measure, some convenience may be had by the use of a decibel meter.

The force transducer system operates in the following manner. After the rings 34 and 42 are aligned on the respective horn parts, and the mouthpiece is assembled with the mouth pipe, the pins are aligned to stab into the mating passages and are located adjacent to the transducer coils. The coils are transducers which provide an output signal indicative of pin spacing. During playing of the instrument, the pins are moved as force is increased on the horn. That is, the player applies force as he holds the instrument, forcing the instrument against his lips. This requires a slight travel between the mouthpiece and mouth pipe, typically measured in range of just a few thousandths of an inch. Assume that the maximum range is something on the order of 0.005 inches. The pins are permitted to travel through some range of excursion approximating this range. The mouthpiece thus fits into telescoping relationship to the mouth pipe and moves ever so slightly as force is applied. As the force is increased, the pins move closer to the coils and thereby provide a change in output signal which is indicative of change in spacing. This compressive load applied to the equipment is measured and converted to a signal by the force converter 22. This signal is then recorded as a function of time and thereby becomes an important variable recorded with other variables to define the quality of the notes played by the musician. The musician then performs a set of scales at selective sound levels or intensities, for instance, the same scale may be played four or five times at different sound levels to assure that a wide range of notes is recorded to define suitable data. When the musician has played what seems to be quality notes, the data can then be analyzed.

The quality of music is dependent upon the force applied to the horn, thereby pressing the mouthpiece against the lips of the user. This is repeated perhaps years later. The recorded data is then compared. An important factor, for a given note at a particular intensity of sound level, is whether or not the force applied by the musician has changed. It will be understood that there is an optimum force, and it is preferable that the musician play music at a reduced force to thereby reduce the force or load applied through the horn to the lips of the musician. One can assume while the lips are a resilient membrane actively involved in the formation of each note, they are nevertheless apt to be damaged. It takes a permanent deformation as a result of excessive force. The force can then be observed or measured. If the musician learns that, over a period of time, he has changed force, he can take corrective steps to reduce this force to an acceptable minimum force. As will be understood, the minimum may vary with the particular frequency and intensity. However, such data is recorded to thereby assure that the musician is able to correlate force with frequency and intensity.

The method disclosed herein preferably includes the steps of making a reference recording. That is, the musician should make a recording of different notes, typically by playing scales, at specified intensities or levels. The notes are preferably sustained for an interval to assure clean recordings free of transients so that data is preserved. This serves as a reference. Resort can be had to this later so that the musician is able to compare similar notes at similar intensities and observe whether or not the forces applied through the horn are similar. If there is a marked change in force, it may suggest that the musician has lapsed into undesired habits or has otherwise engendered harm or damage to his lips and mouth. This provides an instructive method for the musician, encouraging the musician to reduce the force applied to the lips.

Another benefit derives from using three or four transducers around the horn. If the loading is not evenly applied, the force at all transducers can be measured to detect irregular loading. This is generally undesirable; such data may indicate a need to apply uniform loading between the horn and lips of the player.

With this in view, the musician can protect himself against damage to his lips and mouth. Particularly in light of the fact that the damage appears to be cumulative and not necessarily reversible, the professional career of the musician can be extended. It is also very important in the event the musician undergoes trauma as for instance dental work which in some fashion changes the quality of the music as a result of mouth structural changes.

While the foregoing is directed to the preferred embodiment, the scope thereof is defined by the claims which follow:

We claim:

1. An apparatus for determining the force applied by a horn musician to his lips during playing, the apparatus comprising:
   (a) first means affixed to the horn mouthpiece;
   (b) second means affixed to the horn mouth pipe;
   (c) alignment means between said first and second means; and
   (d) means for measuring movement of said alignment means wherein such movement is indicative of the force applied by the musician through the horn against the lips of the musician.

2. The apparatus of claim 1 wherein said measuring means responds to the relative movement between said first and second means as force is applied to the horn.

3. The apparatus of claim 2 wherein said first and second means are joined by removable clamp means when the horn is not in use.

4. The apparatus of claim 3 including resilient means spacing said first and second means apart at a spacing subject to change with horn force and said resilient means is aligned between said first and second means.

5. The apparatus of claim 4 wherein said alignment means comprises alignment pins.

6. The apparatus of claim 5 including receptacles matching said alignment pins in size and location to receive said pins therein, and wherein said pins and said receptacles comprise an inductively coupled proximity dependent measuring apparatus and is said measuring means.

7. An apparatus for determining the force applied by a horn musician to his lips during playing, the apparatus comprising:
   (a) first means affixed to the horn mouthpiece;
   (b) second means affixed to the horn mouth pipe;
   (c) alignment means between said first and second means; and
   (d) inductively coupled proximity measuring means between said first and second means for forming a signal indicative of spacing therebetween as an indication of the force applied to the horn.

8. The apparatus of claim 7 wherein said proximity measuring means responds to relative movement between said first and second means as force is applied to the horn.

9. The apparatus of claim 8 wherein said first and second means are joined by removable clamp means when the horn is not in use.

10. A method of determining quality of music comprising the steps of:
    (a) recording as a function of time musical notes played from a horn;
    (b) recording simultaneously as a function of time the force applied by the musician through the horn against the lips of the musician; and
    (c) wherein force applied by the musician between the horn and lips of the musician is measured at multiple sensors circumferentially arranged around a horn mouthpiece, and the force at each sensor is individually compared with the forces at the remaining sensors.

11. The method of claim 10 further including the steps of measuring the compressive load applied between horn mouthpiece and mouth pipe as a result of the several forces from said sensors.

12. The method of claim 10 including the step of mounting the horn mouthpiece and mouth pipe for telescoping axial movement, and measuring force as a function of time during playing of specific notes.

13. The method of claim 12 wherein the force is measured during playing of notes at selected frequencies and selected intensities.

14. The method of claim 12 wherein the notes are played in scales.

15. The method of claim 12 wherein the notes are sustained for an interval to permit dynamic transients to settle.

16. The method of claim 12 including the step of analyzing frequency content of the notes.

17. The method of claim 16 including the step of recording frequency content as a function of time.

* * * * *